Patented Nov. 21, 1950

2,530,635

UNITED STATES PATENT OFFICE 2,530,635

SILICEOUS SHEET MATERIAL COATED WITH PLASTICIZED ORGANOSILICON CONDENSATE

Frank J. Sowa, Cranford, N. J.

No Drawing. Application July 25, 1945,
Serial No. 607,099

9 Claims. (Cl. 117—122)

This invention relates in general to adhesives and in particular to adhesive sheets and tapes having a flexible backing and a pressure-sensitive adhesive coating thereon, and to correlated improvements designed to enhance the features, characteristics and utility of such products.

There are several types of pressure-sensitive sheets and tapes on the market, one of which comprises a non-fibrous cellulosic backing, such as cellophane having a normally tacky pressure-sensitive adhesive coating on one surface. Such a tape, however, is entirely unsuited for use where the tape will be subjected to temperatures above about 100° C. for the reason, first, that the cellulosic backing gradually loses its plasticizer and becomes embrittled, and, second, because the adhesives commonly employed on such tape have a rubber base which becomes tacky at temperatures slightly above 100° C., but which dries out and becomes brittle upon prolonged exposure to elevated temperatures.

The second type of tape now available is commonly known as "electricians' friction tape" which comprises a backing formed of cotton fabric carrying a normally tacky pressure-sensitive adhesive thereon which contains rubber and/or bitumen. The adhesive used on this type has all the disadvantages of the rubber adhesive used on the first-mentioned sheet or tape. Accordingly, it is apparent that none of the sheets and tapes now available is adapted to be used at temperatures above 150° C. or to be exposed, for substantial periods of time, to elevated temperatures.

Nevertheless, there is a great need for an adhesive sheet or tape which will withstand temperatures up to 350° C. and exposure to elevated temperatures above 100° C. for long periods of time. Such sheets and tapes would solve problems arising in electric wiring on furnaces, electric hot plates, ovens, stills and other heat exchange heating and air conditioning equipment, where temporary connections have to be made. Moreover, such sheet or tape would find a wide use as a masking tape for the application of heat-curing resin lacquers to metallic and ceramic surfaces where the resin is to be subjected to a curing operation at an elevated temperature, after which the sheet or tape is removed. Numerous other uses of high heat-resisting tape are indicated in metallurgy, plastics, etc., for example, in holding together the parts of molds for casting metals or thermosetting plastics, also in holding parts together in high-temperature laminating.

Therefore, it is a general object of the present invention to provide a pressure-sensitive flexible adhesive sheet material which has a relatively high heat-resistance as compared to prior tapes.

It is a specific object to provide an adhesive tape capable of being used at temperatures up to 550° C. without substantial deterioration and of being subjected for long periods of time to temperatures from 150° C. to 350° C. without adverse effects on the tape.

Another specific object is to provide a pressure sensitive tape for use in the electrical industry which is capable of remaining substantially unchanged when subjected to relatively high temperatures for long periods of time, that is in which the flexibility, tackiness, thermal softening point, dielectric constant, and other essential characteristics remain substantially unchanged.

Other objects of the invention will in part be obvious and will in part appear hereinafter.

According to the present invention there is provided an adhesive sheet material characterized by having a heat-resistant flexible backing sheet and a pressure-sensitive, normally tacky thermosetting adhesive coating thereon comprising a poly organo siloxane, a tack-producing agent and preferably a non-thermosetting plasticizer therefor. In another embodiment of the invention the organo silicon polymer is a poly organo siloxane which is normally tacky and pressure-sensitive at normal room temperatures but which, upon heating, polymerizes to a non-tacky solid. Thus the adhesive sheet material is normally tacky and pressure-sensitive initially but after heating; during or after use, it becomes a non-tacky binder.

For the backing sheet, there may be employed any sheet material such, for example, as cellophane, paper, felt, fabric, but preferably a material of high heat resistance is employed such, for example, as paper, fabric or felt which has been sized with a thermosetting resin, such, for example, as with a melamine formaldehyde resin, a urea-formaldehyde resin or phenolformaldehyde resin, which resins increase the heat resistance of the backing sheet, also papers, felts and fabrics formed of heat-resistant infusible fibres such, for example, as siliceous fibres, e. g. glass fibres, asbestos fibres, mineral wool fibres and mixtures of these with each other or with natural fibres. The sheet material may be in the form of sheets having large dimensions in two directions or in the form of a tape which may be wound upon itself into a roll.

The adhesive is initially tacky but is converted upon heating to a nontacky state. In this adhesive I employ heat-convertible organo-siloxanes produced from organo-silanes having the general formula $R_ySiX_z$ in which X is a hydrolysable radical selected from the group consisting of halogen and —OR' radicals, and in which R and R' are organic radicals selected from the group consisting of aliphatic, aromatic, alicyclic and heterocyclic radicals, which are more particularly described hereinafter, $y$ having the value 1 or 2 and $z$ being 2 or 3. Such silanes are prepared by the Grignard reaction. Thus, these silanes are of two types:

(1) $RSiX_3$ and (2) $R_2SiX_2$.

(1) The organo-silanes of the type $RSiX_3$ produce on hydrolysis or acidolysis an organo silane-triol, for example:

$$RSiX_3 + 3H_2O \rightarrow RSi(OH)_3 + 3HX$$

The hydrolysis is promoted by the use of mineral acids as catalysts and by heating up to 100° C. The organo silane-triols thus formed polymerize by condensation either spontaneously or by further heating up to 180° C., to form a poly-organo-siloxane having the structural unit:

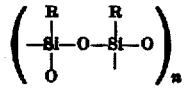

If the condensation is stopped before completion, as by cooling or neutralization, the intermediate polymer will be a solid or liquid adhesive of excellent bonding power, water resistance. The liquid intermediate condensate is a tacky thermoplastic liquid or semi-solid which can be converted upon continued heating, up to 180° C. to a nontacky infusible poly organo-siloxane resin which shows excellent heat stability up to 350° C. for long periods of time.

(2) Of the organo-silanes of the second type, $R_2SiX_2$, I employ only those in which one of the R radicals is a hydrocarbon radical selected from the class consisting of branched-chain aliphatic, unsaturated aliphatic and aromatic hydrocarbon radicals. Such silanes are converted, upon hydrolysis or acidolysis, to the corresponding organo silane-diols, for example, $$R_2SiX_2 + 2H_2O \xrightarrow{HCl} R_2Si(OH)_2 + 2HX$$

which silane-diols condense with themselves spontaneously or by heating up to 180° C. to form poly di-siloxanes having the structural unit:

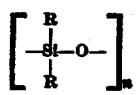

If the condensation is arrested at an intermediate stage, valuable liquid or solid condensates are produced which are tacky adhesives of good bonding power and water resistance. As in the case of the intermediate condensate formed from the silane-triols, this intermediate is initially thermoplastic but is heat-convertible to a water-resistant, nontacky solid poly-siloxane resin.

The hydrolysis of the silane is readily effected in the case of the lower aliphatic members by merely mixing with an excess of water and in the case of the higher members by heating the mixture with an excess of water up to 100° C. Acids promote the hydrolysis and suitable acids are hydrochloric, sulfuric, phosphoric, and the like.

The silane-diols and silane-triols may also be produced from the silanes by acidolysis, for example, by heating the silane with an excess of the molecular equivalent of organic acid such, for example, as acetic, lactic, citric, or the like whereupon a reaction takes place according to the following equation:

$$R_ySi(OR')_z + zR''COOH \rightarrow R_ySi(OH)_z + zR''COOR'$$

This reaction can be carried out even in the absence of water by heating the mixture in a reflux and then distilling off the volatile ester produced.

By way of illustrating but not by way of limiting the invention, there will be given the following examples of suitable silanes for use in the second embodiment of the invention. Among the silanes of the type $RSiX_3$ there may be mentioned trimethoxy ethyl silane, triethoxy methyl silane, tributoxy amyl silane, trimethoxy allyl silane, triethoxy phenyl silane. Also, from 1 to 3 halogen atoms may be substituted for the alkoxy groups in the above-mentioned examples. Thus, one can use monomethyl trichloro silane, monoethyl dichloro monoethoxy silane, monoamyl monochloro dibutoxy silane, and the like. Of the silanes of the type $R_2SiX_2$, there may be used compounds in which $X_2$ represents one halogen and one alkoxy or 2 halogen atoms or 2 alkoxy groups, and $R_2$ comprises at least one branched chain aliphatic radical, such for example, as methyl isopropyl, di-isopropyl, di-isobutyl, di-secondary butyl, or at least one unsaturated aliphatic radical, as for example, methyl allyl, ethyl-crotyl, di-methallyl, di-allyl, or at least one aromatic hydrocarbon radical such for example as ethyl-tolyl, di-phenyl, phenyl-tolyl, and phenyl xylyl; more specifically, monomethallyloctodecyl-dichlorosilane, methallylphenyldiethoxysilane, and the like.

The adhesive composition may be varied, for example: Instead of using a single silane, there may be used (a) mixtures of two or more of the silanes of same or different type, so that the polysiloxane resin will be a copolymer of the different silanes. Further, there may be used (b) copolymers of a silane of either type with a non-silicon containing organic compound, for example, with cellulose esters, cellulose ethers, synthetic resins or resin-forming compounds such as urea and formaldehyde, vinyl chloride, styrene, butadiene, and the like, as described in my prior abandoned applications Serial Nos. 337,833 filed May 29, 1940, 419,986 filed November 21, 1941, and 422,237 filed December 9, 1941; (c) further, two or more separately condensed poly organo-siloxanes of the type above described may be mixed, and used in the adhesive; and (d) the poly organosiloxanes may also be mixed with compatible known adhesives, especially with heat-curing intermediate condensates of urea-formaldehyde, phenol-formaldehyde, melamine-formaldehyde, and the like, and the mixture used. The use of mixtures and copolymers is advantageous for obtaining a wider range of solubility, viscosity, tackiness, and thermal curing conditions because one can vary (1) the nature of the ingredients, (2) the ratio thereof and (3) the extent of polymerization.

To the adhesive composition, there is preferably added a plasticizer for the intermediate tacky polyorgano siloxane. The plasticizers are those commonly employed for plasticized cellulose esters such, for example, as dibutyl phthalate, tricresyl phosphate, diamyl phenol, tributyl citrate.

However, I have found that many advantages arise from plasticizing the intermediate polyorgano-siloxane, used as the adhesive base, with a liquid organo-silicon compound which is relatively non-thermosetting so that the final adhesive film comprises a solid nontacky substantially cured polysiloxane plasticized with a liquid substantially uncured organo-silicon compound. Thus, the preferred embodiment of my adhesive composition comprises a heat-convertible polyorganosiloxane and a plasticizer therefor comprising a liquid, non-heat-convertible, organosilicon compound selected from the group consisting of (a) tetra alkyl silanes, (b) tri-alkyl monoalkoxy silanes, (c) mono and di-fluoroalkyl silanes, in which the sum of the carbon atoms in the alkyl groups exceeds 7, (d) tri-alkyl silanols, (e) alkyl silicyl ethers, (f) di and tri-alkyl silicon hydrides, and (g) di-alkyl siloxanes, in which alkyl is straight chain aliphatic group. Omitting the fluorides of class (c) above, examples of the other compounds are, for example, the methyl, ethyl, butyl, propyl compounds, that is, it is preferred to use the lower members of the aliphatic series. Of the fluorides of class (c), there may be given by way of example: monofluorotributyl silane, monofluorotriamyl silane, difluorodibutyl silane, difluorobutylamyl silane, difluorodiamyl silane and the like.

There is preferably added to the composition an agent to augment the tackiness which is a tacky material selected from the class consisting of natural or artificial resins and oxidizing vegetable oils such, for example, as burgundy pitch, rosin, ester gum, gum dammar, gum elemi, gum mastic, unvulcanized rubber, and also soft coumar resins, soft alkyd resins, also linseed oil, rape seed oil, soya bean oil, and the like.

If desired, dyes may be used, pigment or dye may be added to the adhesive composition or backing material itself. Pigmenting may be accomplished by such material as Prussian blue and mineral pigments.

The zinc oxide filler, when used, serves as a reinforcing pigment imparting greater coherency and firmness to the adhesive coating. Colored pigments likewise function as reinforcing pigments and thus have a function in addition to that of coloring the adhesive.

All of the ingredients of the adhesive composition are dissolved in a volatile solvent, the solvent having been selected with regard to the nature of the ingredients. Generally speaking, the composition is soluble in a mixture of esters, chlorinated hydrocarbons and aromatic hydrocarbons.

The adhesive may be applied by spraying, painting or dipping. Any volatile solvent is evaporated and the assembled plies are then subjected to the curing operation to convert the poly organosiloxane to the infusible state.

The curing is effected in general by heat, which can be applied by direct heating means, by infrared radiation or induction heating. The rate of condensation of the siloxanes silanols depends in part on the size of the organic radical in the silanol. The lower alkyl compounds condense very rapidly and spontaneously, even without heating. The higher members and the aryl derivatives condense by heating from 100° to 200° C. Time is also a factor and the longer the time the lower the temperature required. The presence of oxygen greatly accelerates the cure.

The curing time and temperature may both be decreased by using a catalyst, for example, mineral acids, such for example, as hydrochloric, sulfuric, phosphoric, and the like, and/or by the use of a drier, such for example, as lead soaps, such as lead naphthenate, lead resinate and lead linoleate, and the like. Such catalysts and driers should not be added until the thermoplastic condensate is ready for use. When desired, pressure may be used during the cure to promote bonding, shaping, and molding of the laminated structure.

By way of illustration but not by way of limiting the invention, the following specific examples will be given.

*Example I*

170 grams monoamyl triethoxy silane, 90 grams acetic acid, 3 drops $H_2SO_4$ were refluxed together until ethyl acetate was formed and distilled off leaving a viscous liquid comprising a mixture of poly amyl siloxanes. The product was neutralized with ammonia. The product was a viscous normally tacky adhesive. It was excellent for laminating. After using the adhesive, it was heated to 150° C. for 30 minutes whereupon the organo-silicon adhesive was converted to a solid nontacky poly amyl siloxane which was tough, strong, and water resistant.

*Example II*

The mixture of poly amyl siloxane produced according to Example I was plasticized with 10 per cent of liquid tetra diethyl silane and the mixture dissolved in ethyl acetate. This composition was applied to one side of a sheet of paper. The paper was heated to continue the polymer until the tack of exposed adhesive was proper. A pressure sensitive reusable adhesive tape was thus produced.

*Example III*

Seventy grams of di-isopropyl diethoxy silane were mixed with 60 grams propionic acid and 5 drops sulphuric acid and heated until all the ethyl propionate formed was driven off to leave a tacky thermoplastic solid comprising a mixture of di-isopropyl silandiol and poly isopropyl siloxane. The product was neutralized with ammonia and mixed with 2 per cent lead naphthenate as a drier, also 5 per cent linseed oil. A tape of asbestos cloth was coated on one side with the adhesive composition dissolved equal parts ethyl acetate and toluene. An electrician's tape capable of heat curing at 120° C. was thus produced.

*Example IV*

100 grams dimethallyl diethoxy silane were mixed with 100 grams water and 10 grams of 10 per cent hydrochloric acid. Mix and warm for 70 minutes and neutralize and then distill off water under reduced pressure to leave a thermoplastic solid comprising dimethallyl silandiol and poly dimethallyl siloxane. The product was mixed with 10 per cent tricresyl phosphate and dissolved in trichlorethylene. This adhesive was used to laminate together sheets of mica.

I claim:

1. As a new article of manufacture, a flexible backing of high heat resistant fibrous siliceous sheet material coated with an adhesive composition containing an organosilicon condensate, the said organosilicon condensate consisting essentially of an incompletely condensed hydrolysis product of a compound of the class $R_2SiX_2$, in which R is an aliphatic hydrocarbon radical, at least one R having a branched chain, and X is a material selected from the group consisting of halogen atoms and alkoxy groups, and containing as a plasticizer a liquid organosilicon compound selected from the group consisting of mono- and di-fluoro alkyl silanes in which the sum of the carbon atoms in the alkyl groups exceeds 7.

2. As a new article of manufacture, a flexible backing of high heat resistant fibrous siliceous sheet material coated with an adhesive composition containing an organosilicon condensate, the said organosilicon condensate consisting essentially of an incompletely condensed hydrolysis product of a compound of the class $R_2SiX_2$, in which R is a saturated branched-chain hydrocarbon radical and X is a material selected from the group consisting of halogen atoms and alkoxy groups, and containing as a plasticizer a liquid organosilicon compound selected from the group consisting of mono- and di-fluoro alkyl silanes in which the sum of the carbon atoms in the alkyl groups exceeds 7.

3. As a new article of manufacture, a flexible backing of high heat resistant fibrous siliceous sheet material coated with an adhesive composition containing an organosilicon condensate, the said organosilicon condensate consisting essentially of an incompletely condensed hydrolysis product of a compound of the class $R_2SiX_2$, in which R is an unsaturated branched-chain hydrocarbon radical and X is a material selected from the group consisting of halogen atoms and alkoxy groups, and containing as a plasticizer a liquid organosilicon compound selected from the group consisting of mono- and di-fluoro alkyl silanes in which the sum of the carbon atoms in the alkyl groups exceeds 7.

4. As a new article of manufacture, a flexible backing of high heat resistant fibrous siliceous sheet material coated with an adhesive composition containing a polymerized resinous tacky material and an organosilicon condensate, the said organosilicon condensate consisting essentially of an incompletely condensed hydrolysis product of a compound of the class $R_2SiX_2$, in which R is a saturated branched-chain hydrocarbon radical and X is a material selected from the group consisting of halogen atoms and alkoxy groups, and containing as a plasticizer a liquid organosilicon compound selected from the group consisting of mono- and di-fluoro alkyl silanes in which the sum of the carbon atoms in the alkyl groups exceeds 7.

5. As a new article of manufacture, a flexible backing of high heat resistant fibrous siliceous sheet material coated with an adhesive composition containing a polymerized resinous tacky material and an organosilicon condensate, the said organosilicon condensate consisting essentially of an incompletely condensed hydrolysis product of a compound of the class $R_2SiX_2$, in which R is an unsaturated branched-chain hydrocarbon radical and X is a material selected from the group consisting of halogen atoms and alkoxy groups, and containing as a plasticizer a liquid organosilicon compound selected from the group consisting of mono- and di-fluoro alkyl silanes in which the sum of the carbon atoms in the alkyl groups exceeds 7.

6. As a new article of manufacture, a flexible backing of high heat resistant fibrous siliceous sheet material coated with an adhesive composition containing a polymerized resinous tacky material and an organosilicon condensate, the said organosilicon condensate consisting essentially of an incompletely condensed hydrolysis product of a compound of the class $R_2SiX_2$, in which R is the isopropyl radical and X is a material selected from the group consisting of halogen atoms and alkoxy groups, and containing as a plasticizer a liquid organosilicon compound selected from the group consisting of mono- and di-fluoro alkyl silanes in which the sum of the carbon atoms in the alkyl groups exceeds 7.

7. As a new article of manufacture, a flexible backing of high heat resistant fibrous siliceous sheet material coated with an adhesive composition containing a polymerized resinous tacky material and an organosilicon condensate, the said organosilicon condensate consisting essentially of an incompletely condensed hydrolysis product of a compound of the class $R_2SiX_2$, in which R is the isopropyl radical and X is a material selected from the group consisting of halogen atoms and alkoxy groups, and containing as a plasticizer monofluorotributyl silane.

8. As a new article of manufacture, a flexible backing of high heat resistant fibrous siliceous sheet material coated with an adhesive composition containing a polymerized resinous tacky material and an organosilicon condensate, the said organosilicon condensate consisting essentially of an incompletely condensed hydrolysis product of a compound of the class $R_2SiX_2$, in which R is the methallyl radical and X is a material selected from the group consisting of halogen atoms and alkoxy groups, and containing as a plasticizer a liquid organosilicon compound selected from the group consisting of mono- and di-fluoro alkyl silanes in which the sum of the carbon atoms in the alkyl groups exceeds 7.

9. As a new article of manufacture, a flexible backing of high heat resistant fibrous siliceous sheet material coated with an adhesive composition containing a polymerized resinous tacky material and an organosilicon condensate, the said organosilicon condensate consisting essentially of an incompletely condensed hydrolysis product of a compound of the class $R_2SiX_2$, in which R is the methallyl radical and X is a material selected from the group consisting of halogen atoms and alkoxy groups, and containing as a plasticizer monofluorotributylsilane.

FRANK J. SOWA.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,317,891 | Dennison | Apr. 7, 1943 |
| 2,386,466 | Hyde | Oct. 9, 1945 |
| 2,386,793 | Hanford | Oct. 16, 1945 |
| 2,439,689 | Hyde | Apr. 13, 1948 |

Certificate of Correction

Patent No. 2,530,635                                  November 21, 1950

FRANK J. SOWA

It is hereby certified that error appears in the printed specification of the above numbered patent requiring correction as follows:

Column 3, line 5, for "$R_ySiX_x$" read $R_ySiX_z$; column 4, line 8, in the equation, for "$R_ySi(OR')_x$" read $R_ySi(OR')_z$; line 9, for "$R_ySi(OH)_x$" read $R_ySi(OH)_z$;

and that the said Letters Patent should be read as corrected above, so that the same may conform to the record of the case in the Patent Office.

Signed and sealed this 20th day of February, A. D. 1951.

[SEAL]

THOMAS F. MURPHY,
                                                      *Assistant Commissioner of Patents.*